(12) United States Patent
Ranjan et al.

(10) Patent No.: US 10,243,805 B2
(45) Date of Patent: Mar. 26, 2019

(54) WEB-BASED NETWORK TOPOLOGY VIEWER

(71) Applicant: DELL PRODUCTS, LP, Round Rock, TX (US)

(72) Inventors: Alok Ranjan, Bangalore (IN); Chaitanya Aggarwal, Faridabad (IN)

(73) Assignee: Dell Products, LP, Round Rock, TX (US)

( * ) Notice: Subject to any disclaimer, the term of this patent is extended or adjusted under 35 U.S.C. 154(b) by 181 days.

(21) Appl. No.: 15/449,461

(22) Filed: Mar. 3, 2017

(65) Prior Publication Data
US 2018/0254955 A1 Sep. 6, 2018

(51) Int. Cl.
*H04L 12/24* (2006.01)
*H04L 29/08* (2006.01)
*H04L 12/28* (2006.01)
*G06F 17/30* (2006.01)

(52) U.S. Cl.
CPC ........ *H04L 41/12* (2013.01); *G06F 17/30864* (2013.01); *G06F 17/30893* (2013.01); *G06F 17/30905* (2013.01); *H04L 12/28* (2013.01); *H04L 41/22* (2013.01); *H04L 67/02* (2013.01); *H04L 67/146* (2013.01)

(58) Field of Classification Search
USPC ........................................................ 709/223
See application file for complete search history.

(56) References Cited

U.S. PATENT DOCUMENTS

| | | | | |
|---|---|---|---|---|
| 7,836,041 B1* | 11/2010 | Jain | ................... | G06F 17/30864 707/706 |
| 8,644,135 B2 | 2/2014 | Aloush et al. | | |
| 2002/0093537 A1* | 7/2002 | Bocioned | ............. | G06F 3/0483 715/777 |
| 2004/0062585 A1* | 4/2004 | Aoki | ..................... | G06F 3/1205 400/76 |
| 2004/0139170 A1* | 7/2004 | Shen | .................. | H04L 12/2856 709/218 |
| 2006/0112270 A1* | 5/2006 | Erez | ....................... | G06F 21/46 713/168 |
| 2008/0201214 A1* | 8/2008 | Aaron | .................... | G06Q 30/02 705/14.47 |
| 2010/0070638 A1 | 3/2010 | Bhatt et al. | | |
| 2010/0287213 A1* | 11/2010 | Rolls | ..................... | G16H 50/70 707/803 |
| 2014/0321298 A1* | 10/2014 | Chow | .................. | H04L 41/083 370/252 |
| 2014/0355522 A1 | 12/2014 | Diab et al. | | |

(Continued)

*Primary Examiner* — Jude Jean Gilles
(74) *Attorney, Agent, or Firm* — Larson Newman, LLP

(57) ABSTRACT

A network topology viewer provides a simulation of a local area network. Any device communicating via the local area network is represented as an icon with networking details (such as device name, connection type and topology, network address, and port status). Moreover, the network topology viewer is web-based, thus providing a generic or agnostic solution that does not depend on hardware or software capabilities. Any device communicating via the local area network may download the network topology viewer using a software plugin or web-based application. The network topology viewer generates a complete and holistic representation of the local area network, thus simplifying diagnostics and maintenance efforts.

20 Claims, 13 Drawing Sheets

(56) References Cited

U.S. PATENT DOCUMENTS

2014/0364181 A1\* 12/2014 Emura .................. G06Q 50/34
    463/6
2017/0050102 A1\* 2/2017 Kelly ....................... E04H 3/10

\* cited by examiner

WEB-BASED NETWORK TOPOLOGY VIEWER

CROSS-REFERENCE TO RELATED APPLICATION

Related subject matter is contained in co-pending U.S. patent application Ser. No. 15/449,628 entitled "Visual Mapping of Device Alerts," filed of even date herewith, the disclosure of which is hereby incorporated by reference.

FIELD OF THE DISCLOSURE

The present disclosure generally relates to information handling systems, and more particularly relates to a web-based network topology viewer.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

Local area networks are often too complex to diagnose. Residential and business networks connect many diverse devices of different manufactures, different types, and different configurations. Residential and business networks may also include wired and wireless links to these diverse devices. This complexity makes diagnosis and repair difficult.

Exemplary embodiments thus include a network topology viewer. The network topology viewer is a graphical user interface that presents a simple visualization of a local area network. Any device communicating via the local area network is represented as an icon with networking details (such as device name, connection type and topology, network address, and port status). Moreover, the network topology viewer is web-based, thus providing a generic or agnostic solution that does not depend on hardware or software capabilities. Any device communicating via the local area network may download the network topology viewer using a software plugin or web-based application. The network topology viewer generates a complete and holistic representation of the local area network, thus simplifying diagnostics and maintenance efforts. The network topology viewer may also suggest enhancements or upgrades to improve future networking capabilities.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
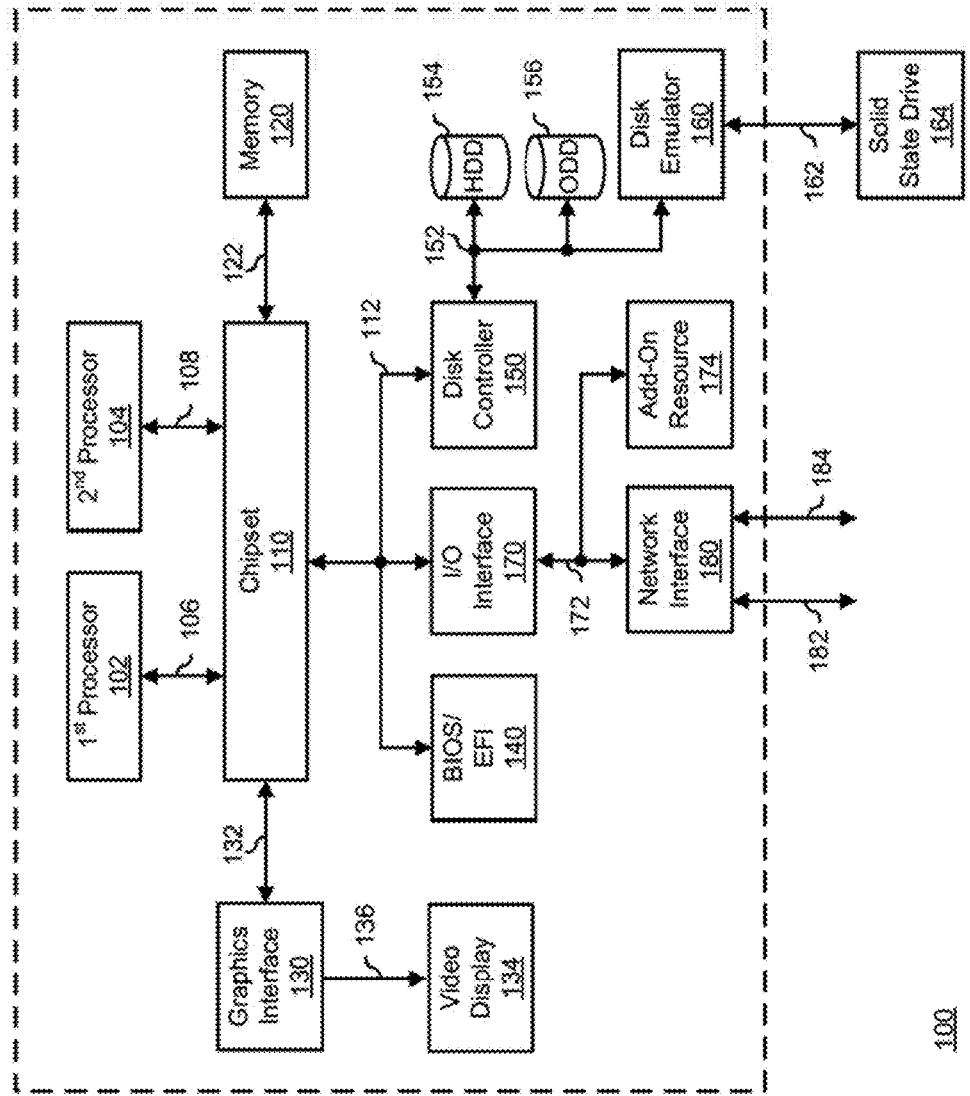
FIG. 1 is a block diagram illustrating an information handling system according to an embodiment of the present disclosure.

FIG. 1 illustrates a generalized embodiment of an information handling system 100, according to exemplary embodiments. For purpose of this disclosure the information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, the information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, the information handling system 100 can include processing resources for executing machine-executable code, such as a central processing unit (CPU), a programmable logic array (PLA), an embedded device such as a System-on-a-Chip (SoC), or other control logic hardware. The information handling system 100 can also include one or more computer-readable medium for storing machine-executable code, such as software or data. Additional components of the information handling system 100 can include one or more storage devices that can store machine-executable code, one or more communications ports for communicating with external devices, and various input and output (I/O) devices, such as a keyboard, a mouse, and a video display. The information handling system 100 can also include one or more buses operable to transmit information between the various hardware components.

The information handling system 100 can include devices or modules that embody one or more of the devices or modules described above, and operates to perform one or more of the methods described above. The information handling system 100 includes one or more processors (such as reference numerals 102 and 104), a chipset 110, a memory 120, a graphics interface 130, a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, the information handling system 100 includes separate memories that are dedicated to each of the processors 102 and 104 via separate memory interfaces. An example of the memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources.

Disk controller 150 includes a disk interface 152 that connects the disk controller 150 to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within the information handling system 100, on a main circuit board of the information handling system 100, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Figure 2:
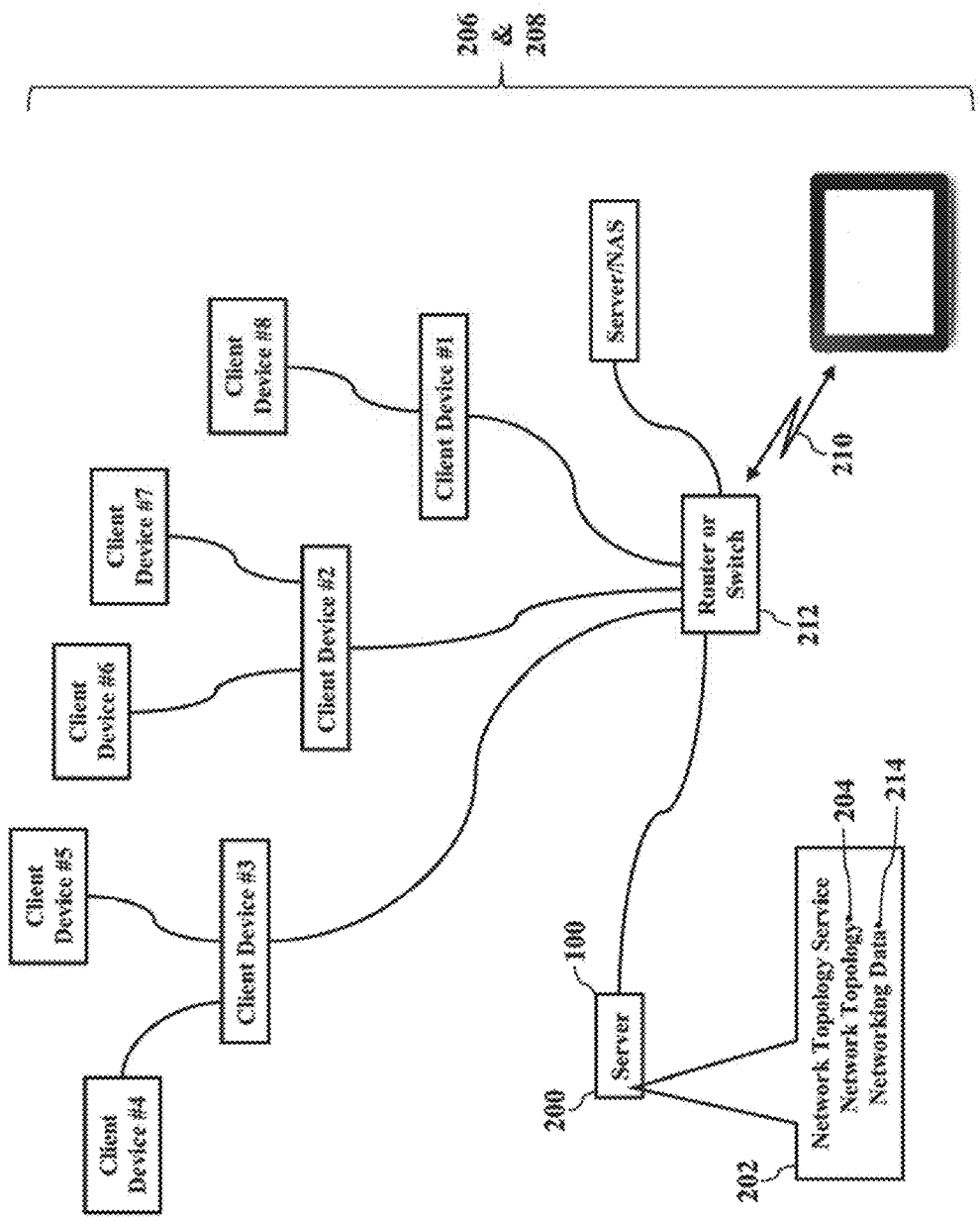
FIGS. 2-4 are simplified illustrations of network topology management, according to exemplary embodiments.
Figure 3:
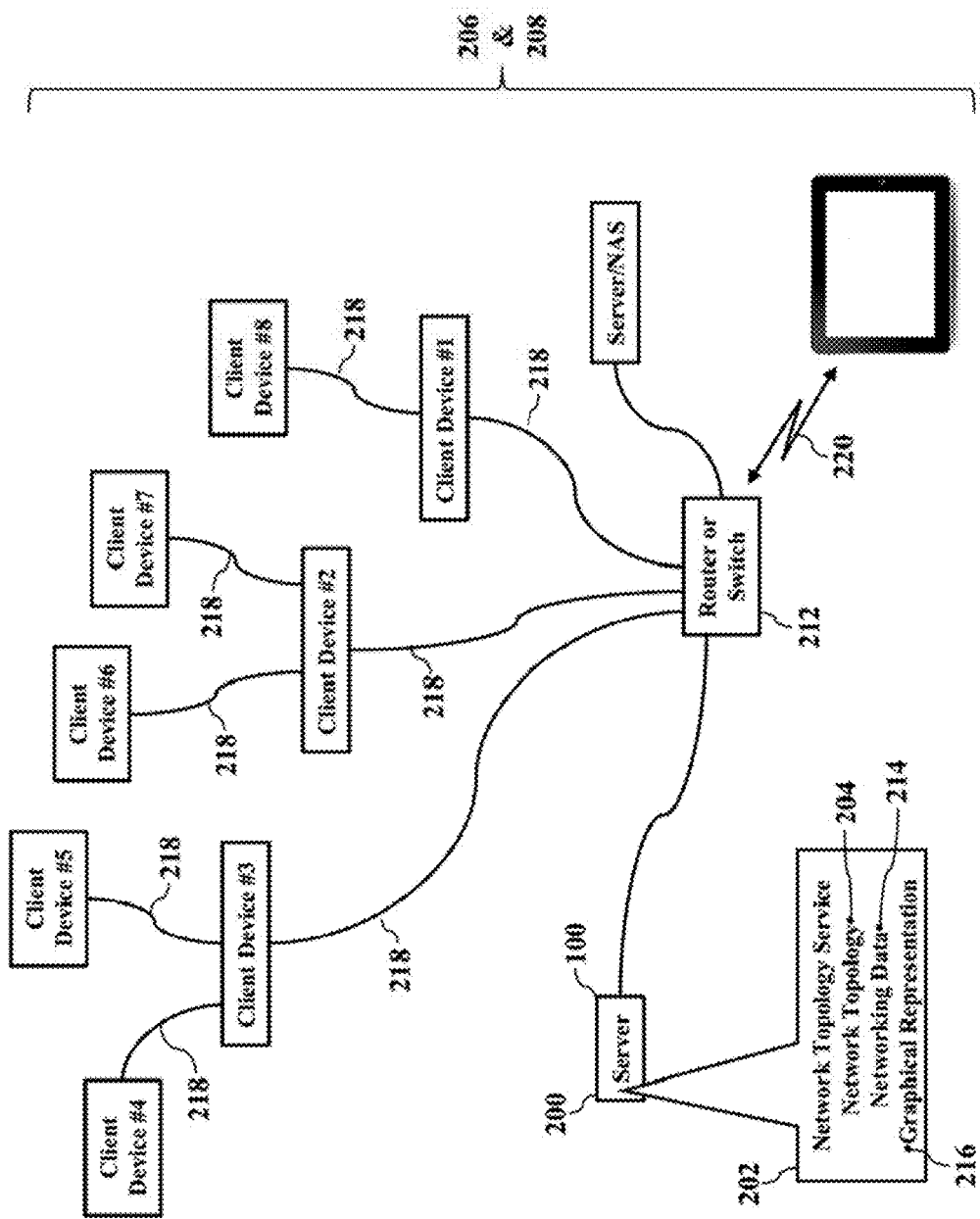
Figure 4:
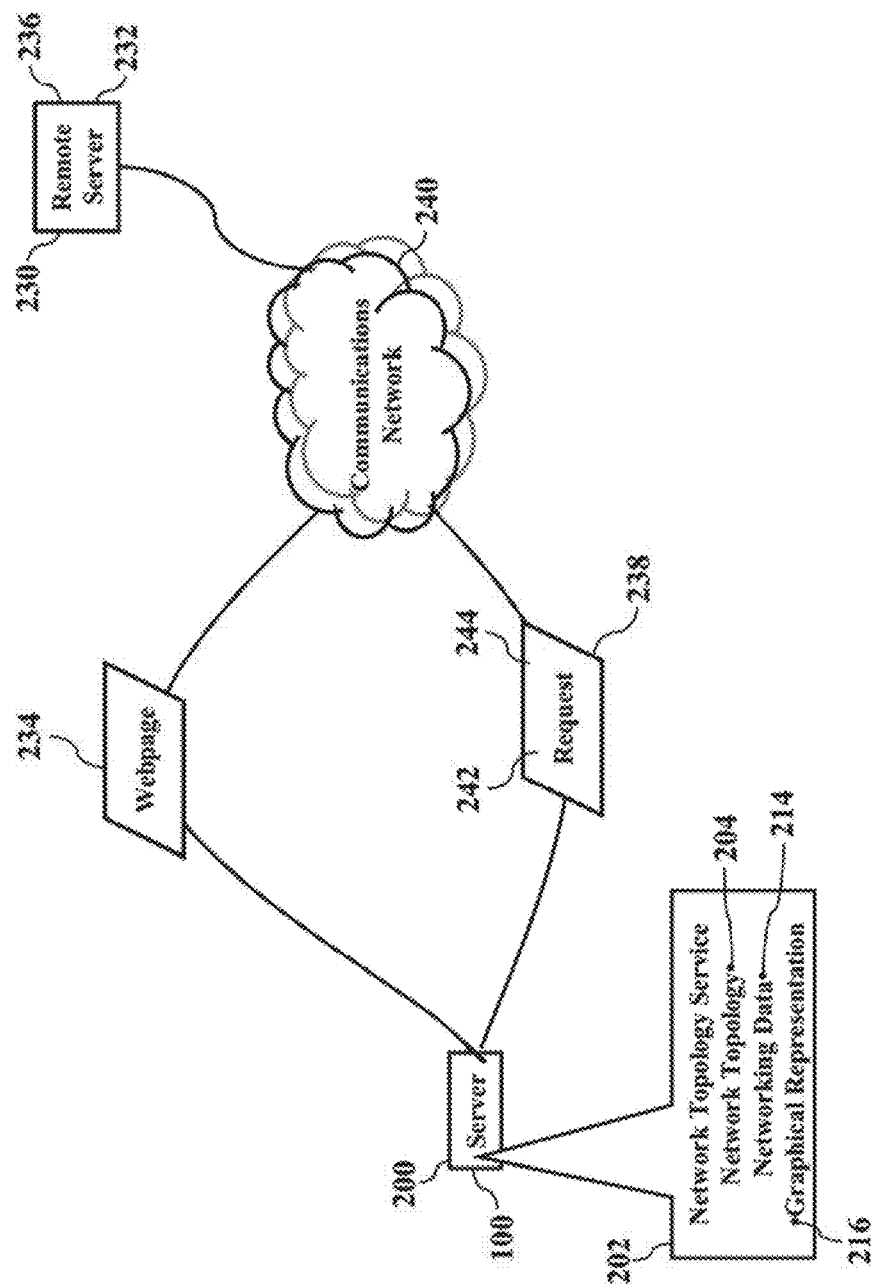

FIGS. 2-4 are simplified illustrations of network topology management, according to exemplary embodiments. Here the information handling system 100 may be configured as a server 200 that provides a network topology service 202. The network topology service 202 generates a network topology 204 associated with a local area network 206. The network topology 204 describes all devices 208 wirelessly or wiredly communicating via the local area network 206. As the reader may understand, there may be many wired and wireless devices 208 registered with the local area network 206. Indeed, in a typical network environment, there may be many or even hundreds of devices 208 communicating via the local area network 206, even including wireless portions 210. Such a large network is too difficult to illustrate. For simplicity, then, FIG. 2 only illustrates several devices 208 logically connected to the local area network 206 via a network access device 212. The reader will understand that exemplary embodiments may be applied or scaled to any number of the devices 208 communicating via the local area network 206. Regardless, the server 200 collects networking data 214 from each one of the devices 208 connected to, or registered with, the local area network 206. The server 200 then uses the networking data 214 to generate the network topology 204 describing the local area network 206.

As FIG. 3 illustrates, the server 200 visualizes the local area network 206. Once the server 200 collects the networking data 214 and generates the network topology 204, the server 200 creates a graphical representation 216. That is, exemplary embodiments graphically simulate the devices 208 and their corresponding intranetwork connections (such as physical data cables 218 interconnecting two or more of the devices 208). Exemplary embodiments may also graphically simulate wireless connections 220 (such as BLU-ETOOTH®, WI-FI®, and other wireless local area networking technologies).

FIG. 4 illustrates client distribution. Once the server 200 generates the graphical representation 216 of the network topology 204, exemplary embodiments may distribute the graphical representation 216 to any requesting client device 230. FIG. 4 illustrates the requesting client device 230 as a remote server 232. The requesting client device 230, however, may be any processor-controlled device. The server 200, for example, may generate or package the graphical representation 216 of the network topology 204 as a webpage 234. The remote server 232 calls or invokes a web browser application 236 and sends a request 238 to the server 200 via a communications network 240 (such as the Internet). The request 238 includes or specifies information that identifies the local area network 206 (illustrated in FIGS. 2-3). The request 238, for example, may include a network identifier 242 that uniquely identifies or names the local area network 206. The request 238 may additionally or alternatively include a device identifier 244 that uniquely identifies or names one of the devices 208 in the local area network 206 (again illustrated in FIGS. 2-3). The remote server 232 sends the request 238 to a network address (for example an Internet Protocol address) associated with the server 200. When the server 200 receives the request 238, the server 200 generates and/or retrieves the network topology 204 that is associated with the network identifier 242 and/or the device identifier 244. The server 200 may further generate or build the webpage 234 describing the graphical representation 216 of the network topology 204. The server 200 may thus send the webpage 234 via the communications network 240 to any destination, such as a network address (e.g., Internet Protocol address) associated with the remote server 232. The remote server 232 calls or invokes the web browser application 236 to process the webpage 234 for display via a display device (such as a touch screen). A user of the remote server 232 may thus visually inspect the graphical representation 216 of the network topology 204.

Exemplary embodiments thus present an elegant, web-based solution. Exemplary embodiments generate a graphical simulation of the physical network topology 204, regardless of complexity and the number of networked devices 208. The networking data 214 may be collected directly from the devices 208, thus ensuring correct and fresh data. The networking data 214 may thus be processed in real time for a detailed, holistic view of the actual local area network 206. Exemplary embodiments may even graphically reveal an IP address, device name, device model and serial number, connection status, and connection type associated with any device 208 communicating via the local area network 206. Exemplary embodiments may also graphically reveal port-to-port connections and port statuses, as later paragraphs will explain.

Exemplary embodiments are agnostic. Because exemplary embodiments present a web-based solution, the graphical representation 216 of the network topology 204 is executed in a device-generic environment. That is, exemplary embodiments are agnostic to the hardware and software capabilities of the requesting remote server 232. Exemplary embodiments may utilize web based JavaScript, Canvas technology, and/or an application programming interface ("API") to build a software plugin. Exemplary embodiments may use the networking data 214 associated with any or all the devices 208 to draw or illustrate the network topology 204 (and any device-to-device or port-to-port physical connections) at runtime. If the networking data 214 is formatted according to a format, then the networking data 214 may be collected from any device 208 without regard for manufacturer and hardware/software capabilities. Exemplary embodiments may use markup data to draw network connections, thus highlighting any simulated device, connection, and/or connection type discovered in the local area network 206. Moreover, runtime markup may help ensure the graphical representation 216 of the network topology 204 remains intact, thus keeping the visual resolution correct even if a user zooms in or out for detail.

Runtime execution is beneficial. Exemplary embodiments may be triggered at runtime using available events. The graphical representation 216 of the network topology 204 may be easily customized using configuration properties. Port and connections statuses, including any of the networking data 214, may be easily changed at runtime if there is change in state of the underlying local area network 206. Exemplary embodiments are thus easily integrated into network policies, and the graphical representation 216 of the network topology 204 may be customized using standard browser viewing options and schemes.

Exemplary embodiments may also be used offline. Once the graphical representation 216 of the network topology 204 is generated, exemplary embodiments may store or archive the graphical representation 216 for later retrieval and use. That is, exemplary embodiments may provide or recall the graphical representation 216 for offline visual reference.

Exemplary embodiments may also be remotely provided. Because the solution is web-based, the server 200 may be accessible from any networked location. The solution thus does not need to be installed on the remote server 232, as the graphical representation 216 of the network topology 204 is based on the networking data 214 collected from the devices 208. The graphical representation 216 is thus available for remote viewing of the network topology 204. This remote capability is very useful for diagnostic assessment in the event of a failure within the local area network 206.

The server 200 may thus provide an enterprise solution. Whenever any of the devices 208 registers with the local area network 206, exemplary embodiments may require, force, or instruct the devices 208 to send their networking data 214 to the server 200 for centralized collection. The server 200 may then generate a network membership that contains or tabulates all the networking data 214 collected from the devices 208. Exemplary embodiments may then quickly query the network membership for the previously-reported networking data 214. Exemplary embodiments, however, may additionally or alternatively poll the devices 208 for fresh networking data 214 (perhaps according to a polling interval of time).

Figure 5:
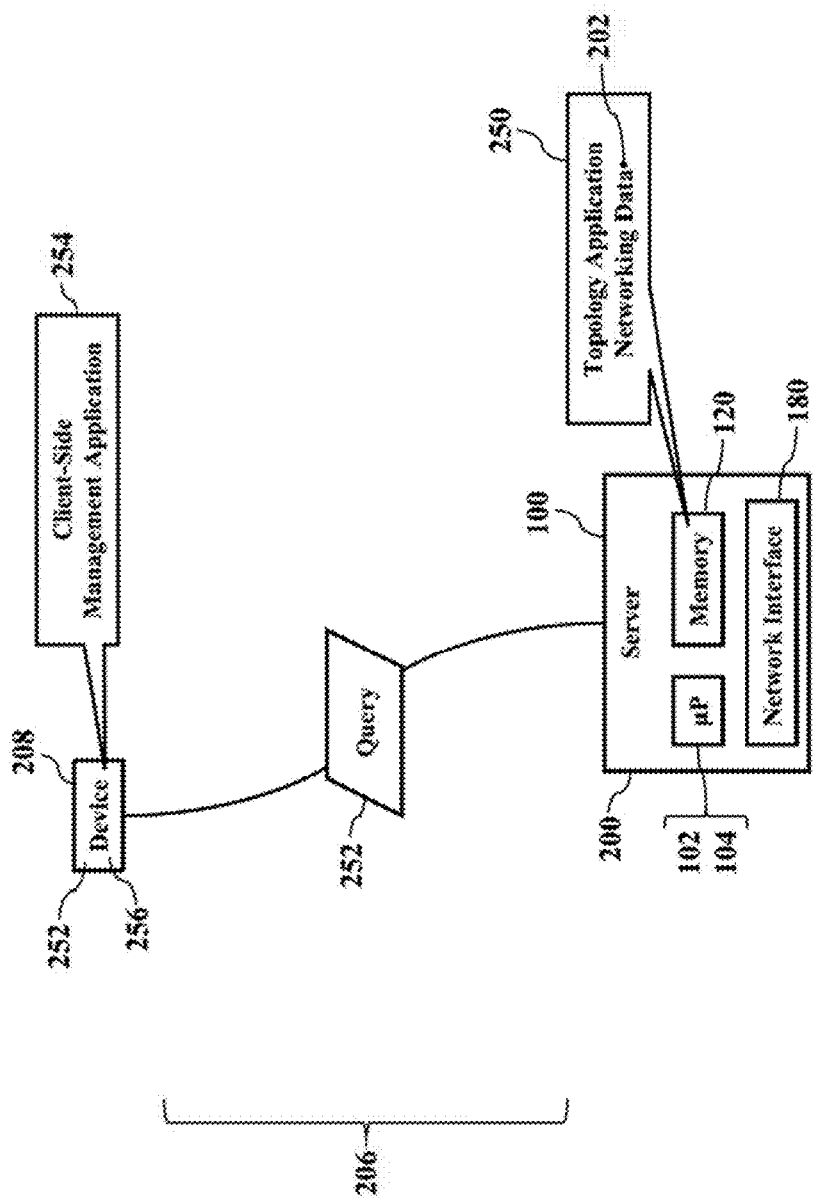
FIGS. 5-6 illustrate a collection mechanism, according to exemplary embodiments.
Figure 6:
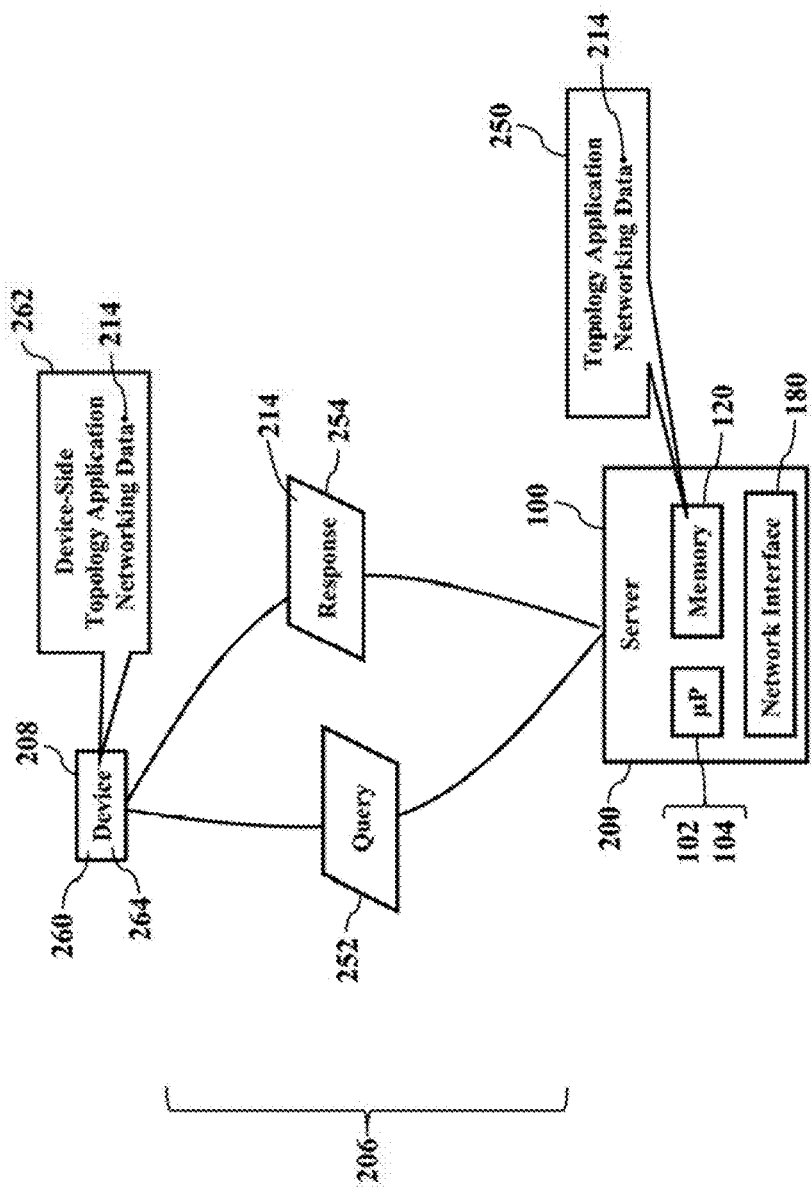

FIGS. 5-6 illustrate a collection mechanism, according to exemplary embodiments. Here the information handling system 100 is again illustrated as the server 200. The server 200 queries the devices 208 in the local area network 206 to obtain the networking data 214. For simplicity, FIG. 5 only illustrates a single device 208. In practice, though, exemplary embodiments may be applied to any number of the devices 208 communicating via the local area network 206. The server 200 has the processors 102 and 104 that execute a topology application 250 stored in the memory 120. The server 200 also has the network interface 180 to the local area network 206 (such as an Ethernet interface and/or a wireless interface). The topology application 250 includes code or instructions that cause the server 200 to send a networking query 252 to the device 208 via the local area network 206. The networking query 252 routes along the local area network 206 to the network address assigned to or associated with the device 208.

FIG. 6 illustrates a query response 254. Once the networked device 208 receives the query 252, the query response 254 is generated. The networked device 208 also has a processor 260 that executes a device-side topology application 262 stored in a memory device 264. The device-side topology application 262 includes code or instructions that cause the device 208 to determine its corresponding networking data 214. The device-side topology application 262 packages the networking data 214 as the query response 254 for transmission via the local area network 206 to the server 200.

Figure 7:
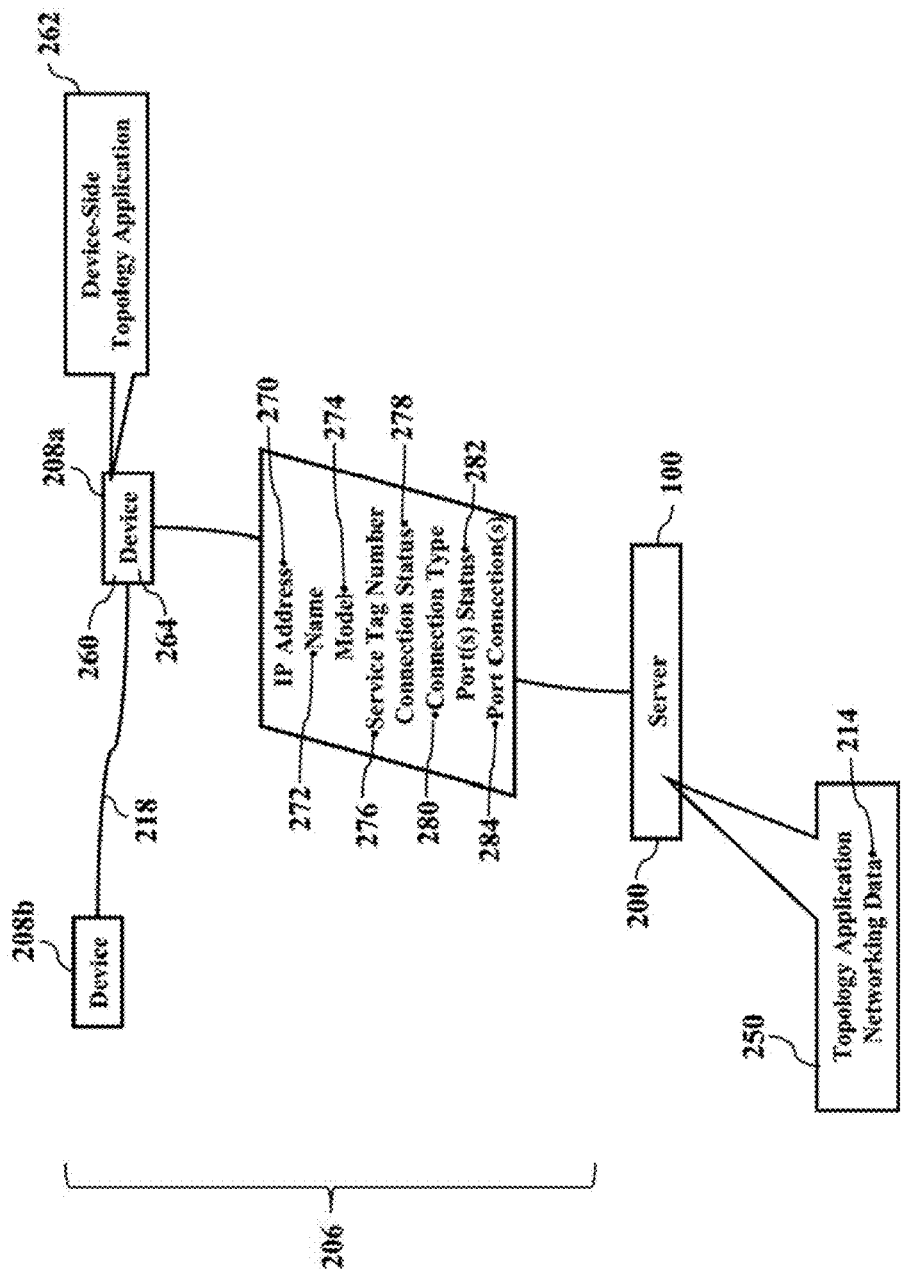
FIG. 7 illustrates networking data, according to exemplary embodiments.

FIG. 7 further illustrates the networking data 214, according to exemplary embodiments. The networked device 208*a* provides its Internet Protocol ("IP") address 270, device name 272, model 274, service tag number 276, connection status 278, connection type 280 (e.g., Ethernet), and port status(es) 282. Moreover, the networked device 208 also provides port connection data 284. That is, the networked device 208 may also identify a physical data cable connection to another device 208*b* in the local area network 206. Indeed, the port connection data 284 may identify the networking data 214 that corresponds to each input port and/or output port. As the reader may understand, many devices have data ports for physical connection to another device 208. Signals and data may thus be received from, and/or transferred to, another device 208 via interconnecting data cables 218. The client-side topology application 250 may thus determine any networking data 214 associated with any of the input ports and/or output ports. The client-side topology application 250 may thus report the networking data 214 on a port-by-port basis, thus fully revealing its physical connections to other devices 208 in the local area network 206.

Figure 8:
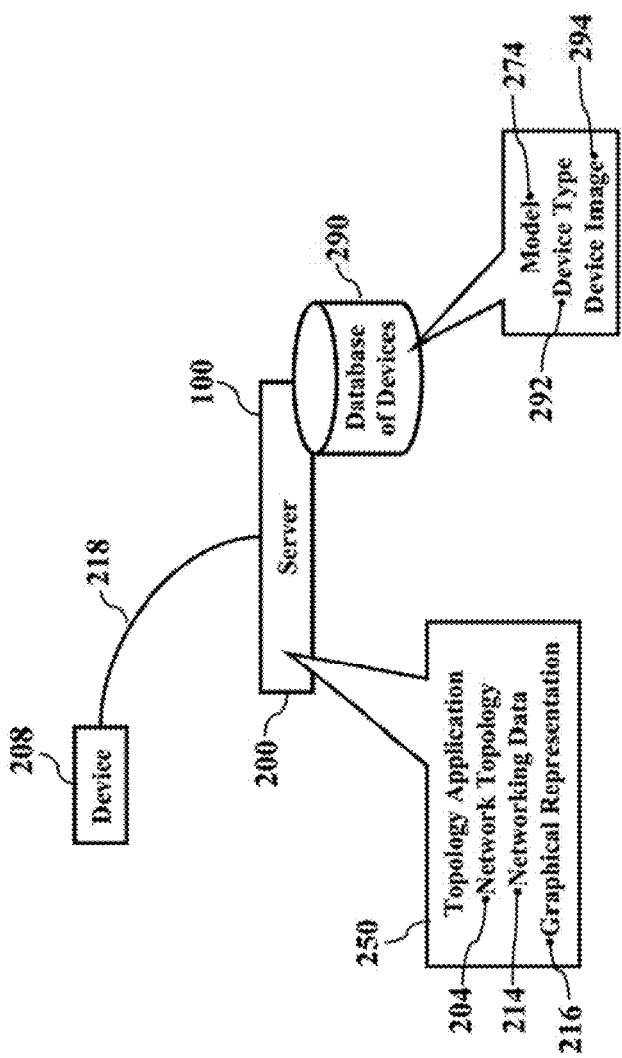
FIG. 8 illustrates device details, according to exemplary embodiments.

FIG. 8 illustrates device details, according to exemplary embodiments. Once the server 200 receives the networking data 214, the server 200 may determine additional data that helps generate the graphical representation 216 of the network topology 204. For example, once the model 274 of the device 208 is determined, exemplary embodiments may query a database 290 of devices. The database 290 of devices is a repository of detailed hardware and/or software information associated with different devices. The database 290 of devices may thus have entries that electronically associate models, serial numbers, and device identifiers to their corresponding hardware and software capabilities. The database 290 of devices may be preloaded or preconfigured with a single manufacturer's products or multiple manufacturers' products. Regardless, the topology application 250 may cause the server 200 to query the database 290 of devices 208 for the model 274 reported by the networked device 208. The database 290 of devices may thus identify a device type 292 that is electronically associated with the model 274. The database 290 of devices may also identify a device image 294 (such as a .jpeg) that is electronically associated with the model 274.

Exemplary embodiments may then generate the network topology 204. Once the device type 292 is determined and the device image 294 fetched, is known, exemplary embodiments may use markup data to highlight any networking data 214 that corresponds to the device 208 in the local area network 206. Exemplary embodiments, for example, may thus graphically emphasize the device image 294 that corresponds to the actual, physical networked device 208. When the graphical representation 216 of the network topology 204 is drawn, any networking data 214 that is virtually represented may be marked up to aid visualization, diagnosis, and fault identification.

Figure 9:
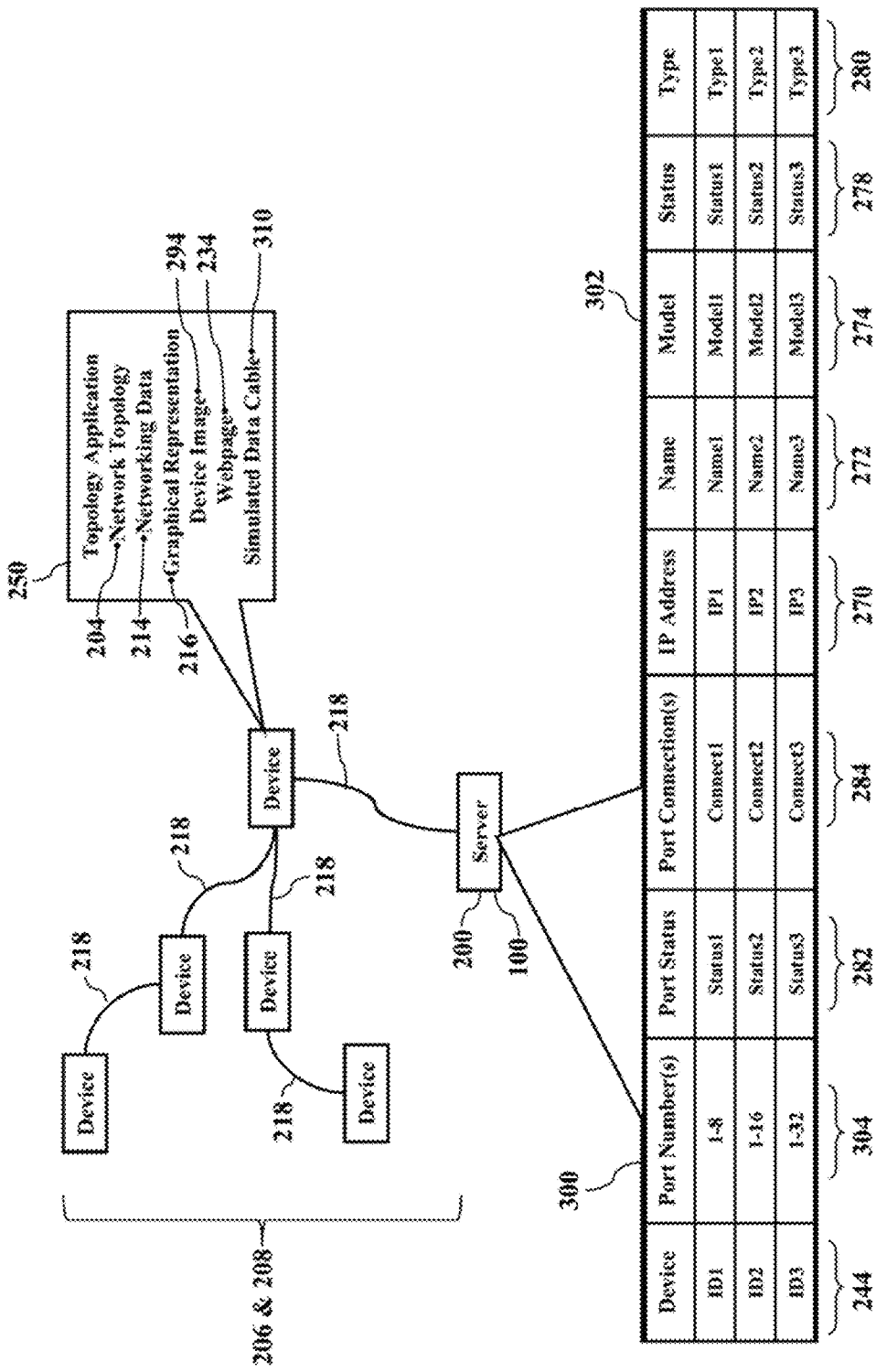
FIG. 9 illustrates a port mapping, according to exemplary embodiments.

FIG. 9 illustrates a port mapping 300, according to exemplary embodiments. Recall that the networking data 214 may include the port statuses 282 and the port connection data 284. The networking data 214 may thus describe any physical data cables 218 that interconnect to other devices 208 in the local area network 206. When the server 200 receives the networking data 214 from any or each device 208 in the local area network 206, the topology application 250 may cause the server 200 to generate the port mapping 300. FIG. 9 illustrates the port mapping 300 as a table 302 that maps, relates, or associates the different devices 208 (perhaps using the device identifier 244) to their corresponding port numbers 304, port statuses 282, and/or physical port connections 284. Each port 304 may thus be electronically associated with the corresponding Internet Protocol address 270, device name 272, model 274, connection status 278, and connection type 280, based on the networking data 214 reported by each device 208 in the local area network 206. The port mapping 300, in plain words, reveals which devices are physically connected via the data cables 218 to other devices 208.

The graphical representation 216 may be drawn. Once the connection details are determined (as revealed by the networking data 214 and/or the port mapping 300), exemplary embodiments may determine the network topology 204 and create its corresponding graphical representation 216. Each device image 294 is retrieved and incorporated into the graphical representation 216 (perhaps as the webpage 234). Exemplary embodiments may also generate simulated data cables 310 that connect between different ports. Because exemplary embodiments are web-based, a user may click or otherwise select any device image 294 or simulated data cable to obtain the detailed networking data 214. Indeed, a user may even select a particular device image 294 or simulated data cable 310 and edit the corresponding textual networking data 214. For example, a user may edit whether a particular physical connection is, or is not, a virtual local are network connection. The user may also click and edit text describing a port status 282 (such as if the corresponding physical port is connected or not, and if yes, is the connection up or down?). The user may also click and edit colors, the device name 272, and other visualization features.

Exemplary embodiments may also include a graphical toolbar. The toolbar may have graphical icons and/or controls for predefined actions. For example, iconic options may allow a user to zoom in or out on a particular device or connection. A search option may allow the user to search for particular text and generate a search result of the networking data 214 containing matching text. Exemplary embodiments may also highlight any device image 294 and/or simulated data cable 310 associated with the matching text. Other actions may disable a particular device or connection, merely by selecting its corresponding device image 294 and/or simulated data cable 310 and changing a status field or option. Another option may save the graphical representation 216 as image data or even a portable document format (PDF) file for offline usage.

Figure 10:
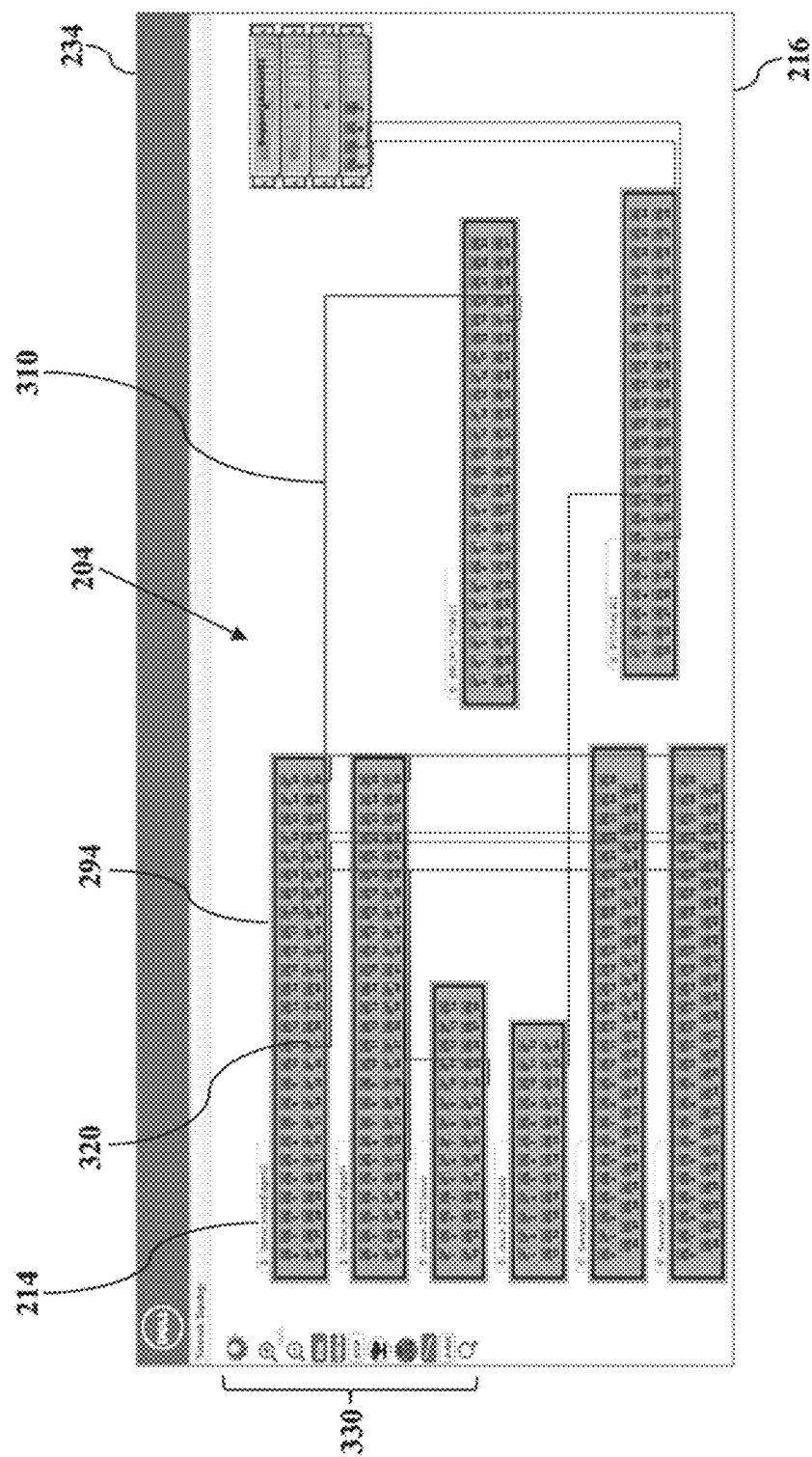
FIGS. 10-12 are screenshots, according to exemplary embodiments.
Figure 11:
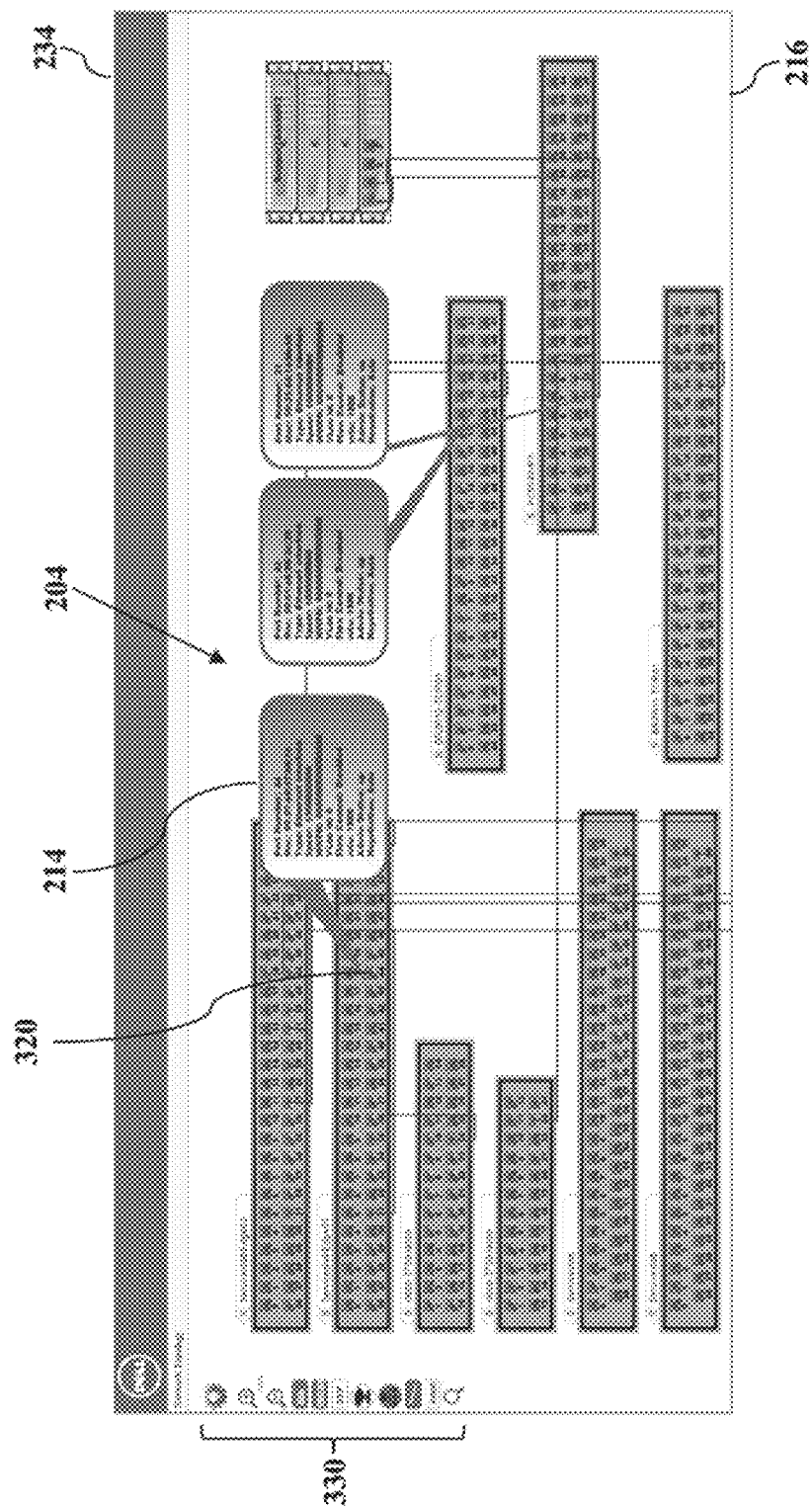
Figure 12:
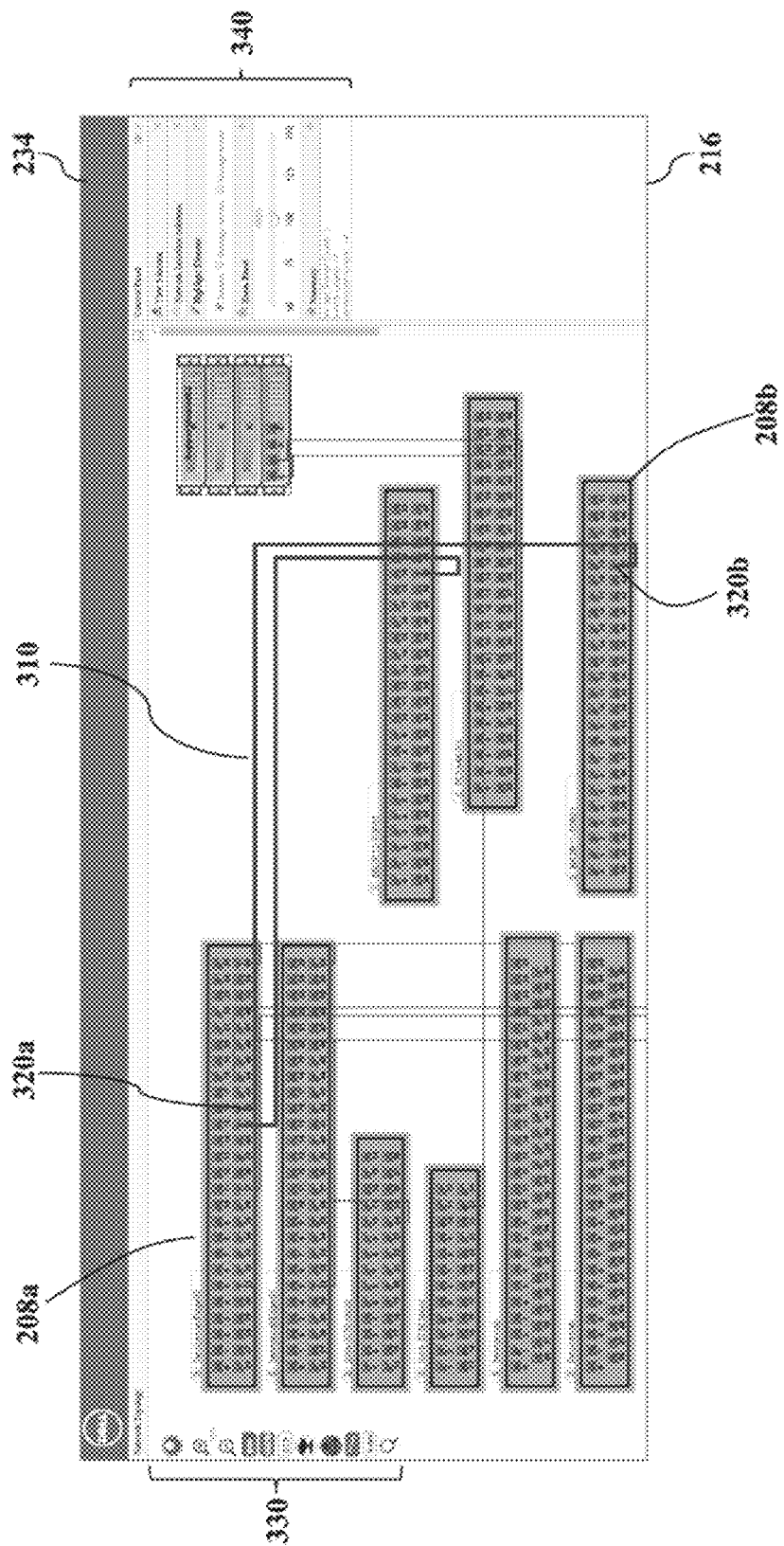

FIGS. 10-12 are screenshots, according to exemplary embodiments. These screenshots illustrate features and capabilities provided by the webpage 234 that displays the graphical representation 216 of the network topology 204. FIG. 10, for example, illustrates the webpage 234 as a graphical user interface that is processed for display (such as by the web browser application 236 illustrated in FIG. 4).

The webpage 234 visually presents a simulation of the local area network (illustrated as reference numeral 206 in FIGS. 2-3 & 5-7). Each one of the devices 208 (registered with the local area network 206) is graphically represented with its corresponding device image 294. Moreover, the webpage 234 may also visually display simulated data ports 320 that correspond to physical ports in each device 208, perhaps along with the simulated data cable 310 that graphically connects to the corresponding port at another device image 294. FIG. 10, in other words, simulates the physical data cables 218 that make port-to-port connections between the devices 208 registered with the local area network 206. The webpage 234 may also display any of the networking data 214 that is associated with a corresponding device image 294.

The webpage 234 may also display a graphical toolbar 330. The toolbar 330 may include graphical controls for predefined actions. The graphical controls may allow a user to place a graphical cursor and/or select a particular control to perform a predefined action. The user may thus zoom in or out on a particular device or connection, search for text displayed within the webpage 234, and even search fields or entries within the networking data 214. Search results may be highlighted for ease of reference. Exemplary embodiments may also highlight any device image 294, simulated data port 320, and/or simulated data cable 310.

FIG. 11 further illustrates the networking data 214. A user may select any graphical features within the webpage 234 to view its corresponding networking data 214. For example, by selecting the any one of the simulated data ports 320, exemplary embodiments may retrieve and display the corresponding networking data 214. The user may thus quickly and easily observe the port's number, MAC address, connection type (e.g., Ethernet), and other networking details.

FIG. 12 illustrates a control panel 340. Here the webpage 234 may further include viewing options for emphasizing or highlighting search results. FIG. 12 especially illustrates a highlighted or bolded simulated data cable 310 connected between two different simulated data port 320a and 320b in different devices 208a and 208b.

Figure 13:
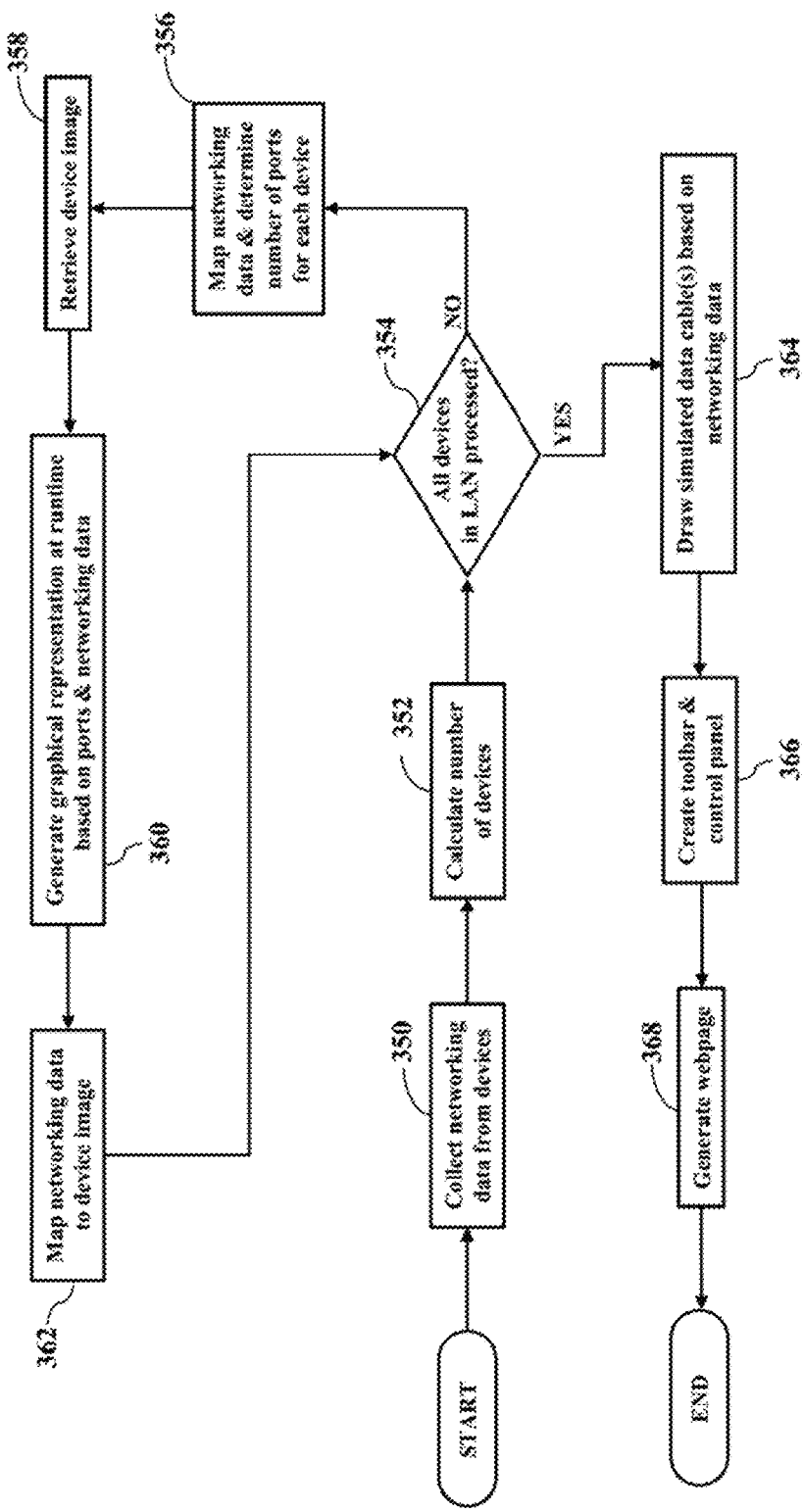
FIG. 13 is a flowchart illustrating a method or algorithm for visualizing a local area network, according to exemplary embodiments.

FIG. 13 is a flowchart illustrating a method or algorithm for visualizing the local area network 206, according to exemplary embodiments. The networked devices 208 are queried to collect the networking data 214 (Block 350). The number of networked devices 208 is calculated based on the networking data 214 (Block 352). If some devices 208 remain to be inventoried (Block 354), then additional networking data 214 is collected and mapped to determine the number of ports for each one of the devices 208 (Block 356). Each device image 294 is retrieved (Block 358) and the graphical representation 216 is generated (Block 360). The networking data 214 is mapped to each corresponding device image 294 (Block 362). Once all devices 208 are inventoried (Block 354), the simulated data cables 310 are drawn based on the networking data 214 defining the ports (Block 364). The toolbar 330 and the control panel 340 are created (Block 366). The webpage 234 is generated (Block 368).

Exemplary embodiments may packetize. The information handling system 100, the server 200, the devices 208, and the requesting client device 230 may interface with the local area network, and/or a wide area network 206 and the communications network 240 (such as the Internet). Messages and data may be packetized into packets of data according to a packet protocol, such as the Internet Protocol. The packets of data contain bits or bytes of data describing the contents, or payload, of a message. A header of each packet of data may contain routing information identifying an origination address and/or a destination address. There are many different known packet protocols, and the Internet Protocol is widely used, so no detailed explanation is needed.

Exemplary embodiments may be applied regardless of networking environment. Exemplary embodiments may be easily adapted to stationary or mobile devices having cellular, Wi-Fi®, near field, and/or Blutooth® capability. Exemplary embodiments may be applied to devices utilizing any portion of the electromagnetic spectrum and any signaling standard (such as the IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes alternatively known as the "World Wide Web"), an intranet, the local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile, such as random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method, comprising:
   receiving, by an information handling system, a request for a network topology associated with a local area network, the request specifying a network identifier associated with the local area network;
   determining, by the information handling system, network addresses associated with devices registered with the local area network;
   sending, by the information handling system, queries to the devices registered with the local area network;
   receiving, by the information handling system, networking information in response to the queries, the networking information reported by the devices registered with the local area network; and
   generating, by the information handling system, a webpage in response to the request for the network topology, the webpage including a graphical representation of the local area network based on the networking information reported by the devices registered with the local area network.

2. The method of claim 1, further comprising generating a simulation of the network topology based on the networking information reported by the devices registered with the local area network.

3. The method of claim 1, further comprising retrieving device images associated with the devices registered with the local area network.

4. The method of claim 3, further comprising incorporating the device images into the graphical representation of the network topology.

5. The method of claim 1, further comprising sending the webpage to a client device.

6. The method of claim 1, further comprising receiving an input to the webpage, the input selecting a device image displayed by the webpage, the device image associated with a corresponding device of the devices registered with the local area network.

7. The method of claim 6, further comprising sending the networking information reported by the corresponding device in response to the input.

8. A system, comprising:
   a hardware processor; and
   a memory device accessible to the hardware processor, the memory device storing instructions that when executed cause the hardware processor to perform operations, the operations comprising:
   receiving a request for a network topology sent from a client device, the request specifying a network identifier associated with a local area network;
   determining network addresses associated with devices registered with the local area network;
   sending queries to the network addresses associated with the devices registered with the local area network;
   receiving networking information in response to the queries, the networking information sent from the devices registered with the local area network, the networking information reported by the devices registered with the local area network;
   generating a port mapping describing physical interconnections between ports associated with the devices registered with the local area network; and
   generating a webpage including a graphical representation of the local area network, the webpage generated based on the networking information reported by the devices registered with the local area network, and the webpage simulating the physical interconnections between the ports associated with the devices registered with the local area network.

9. The system of claim 8, wherein the operations further comprise generating a simulation of the network topology based on the networking information reported by the devices registered with the local area network.

10. The system of claim 8, wherein the operations further comprise retrieving device images associated with the devices registered with the local area network.

11. The system of claim 10, wherein the operations further comprise incorporating the device images into the graphical representation of the network topology.

12. The system of claim 8, wherein the operations further comprise sending the webpage to the client device.

13. The system of claim 8, wherein the operations further comprise receiving an input to the webpage, the input selecting a device image displayed by the webpage, the device image associated with a corresponding device of the devices registered with the local area network.

14. The system of claim 13, wherein the operations further comprise sending the networking information reported by the corresponding device in response to the input.

15. A memory device storing instructions that when executed cause a hardware processor to perform operations, the operations comprising:
  receiving a request for a network topology sent from a client device, the request specifying a network identifier associated with a local area network;
  determining network addresses associated with devices registered with the local area network;
  sending queries to the network addresses associated with the devices registered with the local area network;
  receiving networking information in response to the queries, the networking information sent from the devices registered with the local area network, the networking information reported by the devices registered with the local area network;
  generating a port mapping that describes physical interconnections between ports associated with the devices registered with the local area network; and
  generating a webpage including a graphical representation of the local area network, the webpage generated based on the networking information reported by the devices registered with the local area network, and the webpage simulating the physical interconnections between the ports associated with the devices registered with the local area network.

16. The memory device of claim 15, wherein the operations further comprise generating a simulation of the network topology based on the networking information reported by the devices registered with the local area network.

17. The memory device of claim 15, wherein the operations further comprise retrieving device images associated with the devices registered with the local area network.

18. The memory device of claim 17, wherein the operations further comprise incorporating the device images into the graphical representation of the network topology.

19. The memory device of claim 15, wherein the operations further comprise sending the webpage to the client device.

20. The memory device of claim 15, wherein the operations further comprise:
  receiving an input to the webpage, the input selecting a device image displayed by the webpage, the device image associated with a corresponding device of the devices registered with the local area network; and
  sending the networking information reported by the corresponding device in response to the input.

* * * * *